United States Patent [19]

Nakamura et al.

[11] Patent Number: 4,635,196

[45] Date of Patent: Jan. 6, 1987

[54] TAX OR EXEMPTION SELECTING ELECTRONIC CASH REGISTER

[75] Inventors: Yashuhide Nakamura, Yamatokoriyama; Shigeyuki Yamamura, Tenri, both of Japan

[73] Assignee: Sharp Kabushiki Kaisha, Osaka, Japan

[21] Appl. No.: 625,002

[22] Filed: Jun. 26, 1984

[30] Foreign Application Priority Data

Jun. 30, 1983 [JP] Japan .................................. 58-120794

[51] Int. Cl.$^4$ ............................................. G06F 15/20
[52] U.S. Cl. ..................................... 364/405; 364/403
[58] Field of Search ................................ 364/403–405

[56] References Cited

U.S. PATENT DOCUMENTS

| | | | |
|---|---|---|---|
| 4,056,710 | 11/1977 | Shepardson | 235/437 |
| 4,293,911 | 10/1981 | Oonishi | 364/405 |
| 4,408,292 | 10/1983 | Nakatani | 364/405 |
| 4,430,713 | 2/1984 | Nakatani | 364/405 |

Primary Examiner—Jerry Smith
Assistant Examiner—G. Hayes
Attorney, Agent, or Firm—Birch, Stewart, Kolasch & Birch

[57] ABSTRACT

An electronic cash register, wherein sales data such as sale information and classification information are input before a registration key is operated to cause a registration, includes a plurality of registration keys, a plurality of exemption flags each corresponding to the plurality of registration keys, an exemption flag set circuit for setting and resetting the plurality of exemption flags, an exemption flag detection circuit for detecting whether the set or reset condition of one of the plurality of exemption flags corresponding to one of the plurality of registration keys is actuated after the input of the sale data, and an exemption registration selection circuit responsive to the detection by the exemption flag detection circuit for selectively calculating the total sale price either free from the taxation or with the taxation.

6 Claims, 4 Drawing Figures

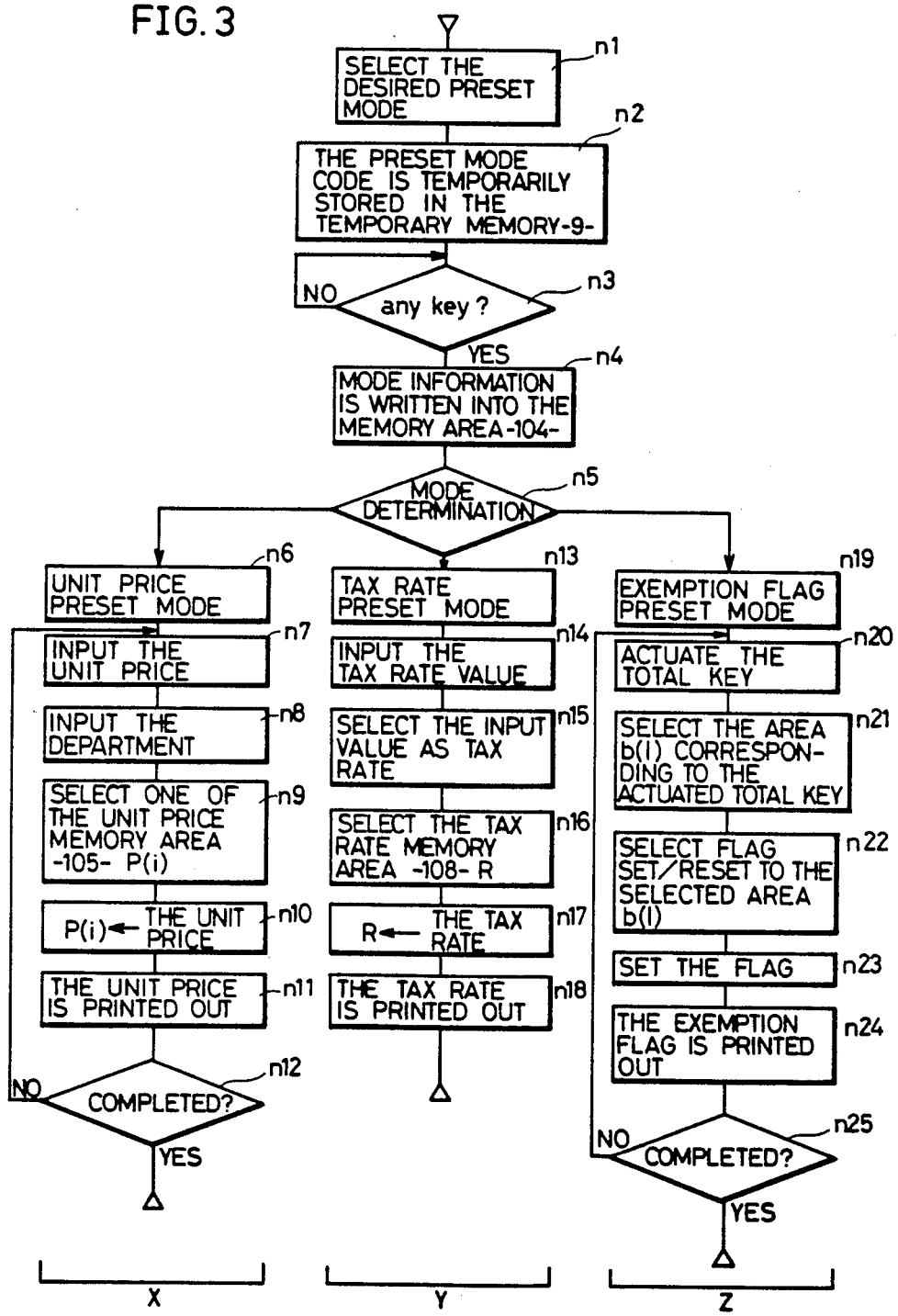

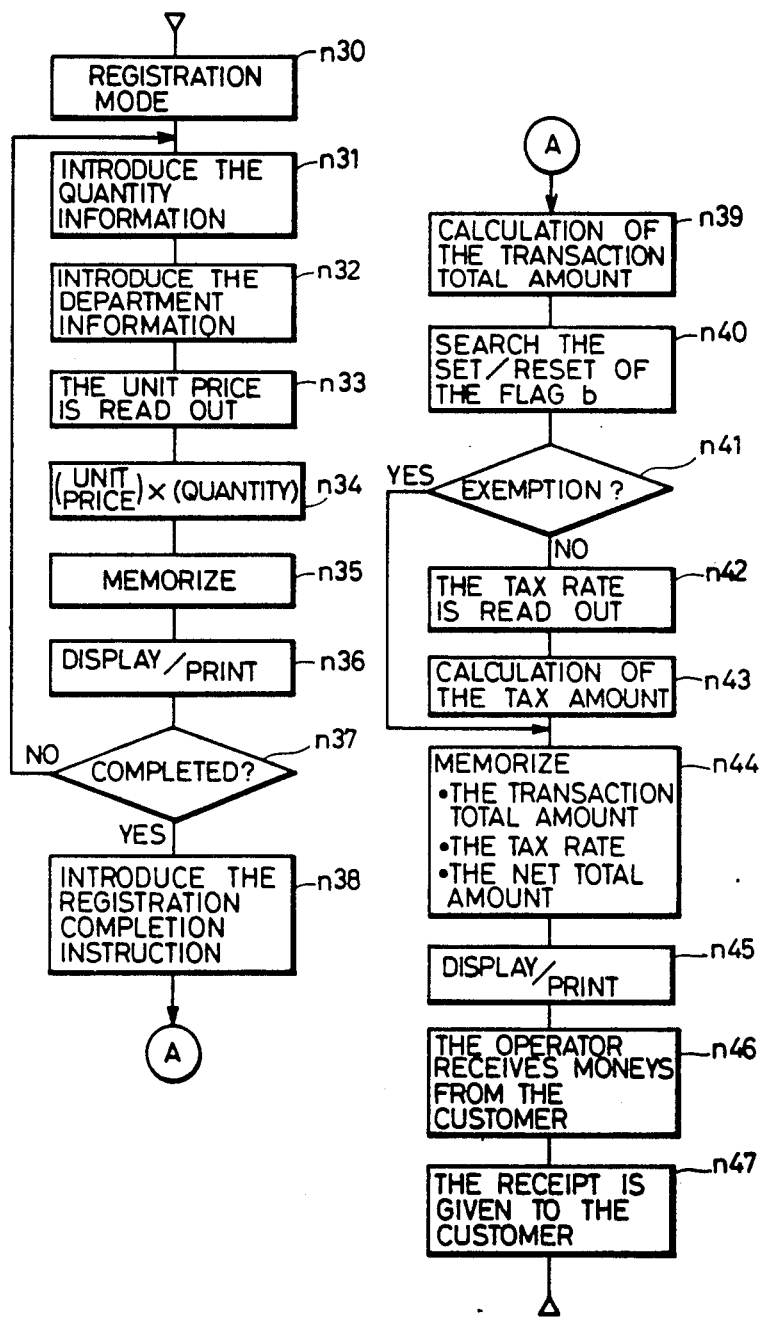

TAX OR EXEMPTION SELECTING ELECTRONIC CASH REGISTER

BACKGROUND OF THE INVENTION

The present invention relates to an electronic cash register which registers each of transaction data by actuating a total key after the transaction data such as the number of articles sold and department numbers are inputted and, more particlarly, to an improved electronic cash register which automatically selects a calculation of the total sales price of an article either free from the taxation or with the taxation, by a total key actuation.

Generally, the transaction articles are divided between dutiable articles and articles free from taxation depending on the prices, the items or the like. In a case where the data of the transaction articles are registered by the conventional electronic cash register, the data of the dutiable articles are registered in a normal mode and the data of the articles free from the taxation are registered in the exemption mode selected by actuating an exemption key.

However, the exemption mode must be selected by the key actuation each time the data of the articles free from the taxation are registered, so that the operation for registering with the exemption is rather complex.

SUMMARY OF THE INVENTION

Accordingly, it is an object of the present invention to provide an improved electronic cash register which automatically selects the calculation of the total sales price of the articles either free from taxation or with taxation, by a total key actuation.

It is another object of the present invention to provide an improved electronic cash register which exempts the articles from the taxation by actuating at least one of the total keys for registering the data after the data of the articles are inputted.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, an electronic cash register, wherein sales data such as sale information and classification information are inputted before a registration key is operated to cause a registration, comprises a plurality of registration keys, a plurality of exemption flags each corresponding to the plurality of registration keys, exemption flag set means for setting and resetting the plurality of exemption flags, exemption flag detection means for detecting whether the set or reset condition of one of the plurality of exemption flags corresponding to one of the plurality of registration keys actuated after the input of the sale data, and exemption registration selection means responsive to the detection by the exemption flag detection means for selectively calculating the total sale price either free from the taxation or with the taxation.

According to another embodiment of the present invention, an electronic cash register employing a tax calculation, wherein merchandise information such as a unit price, taxation information and classification information is preset, a tax calculation means comprises sales data input means for inputting sales data of an item sold, and selection means for selectively calculating the total price of the item sold either free from the taxation or with the taxation.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 shows a flow chart of a data preset operation of the electronic cash register of FIG. 1; and FIG. 4 shows a flow chart for explaining a tax operation and an exemption operation of the electronic cash register of FIG. 1 when the registration mode is selected.

DETAILED DESCRIPTION OF THE INVENTION

Figure 1:
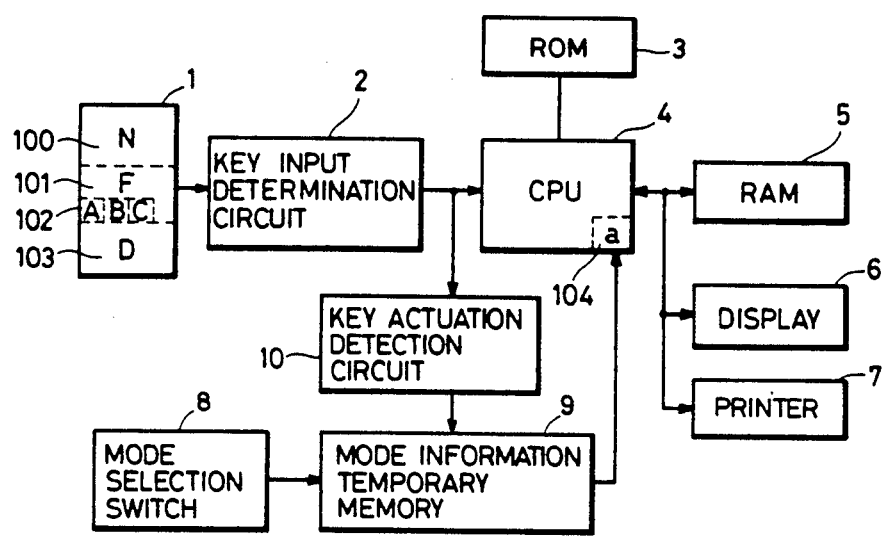
FIG. 1 shows a block diagram of an embodiment of an electronic cash register of the present invention.
Figure 2:
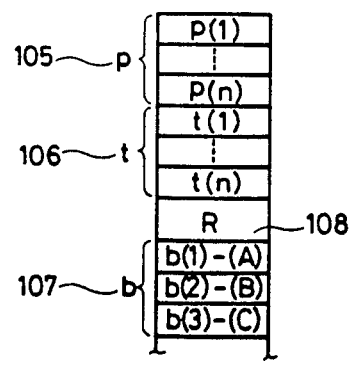
FIG. 2 shows a construction of a random access memory (RAM) included in the electronic cash register of FIG. 1.

FIG. 1 shows a block diagram of an embodiment of an electronic cash register of the present invention. FIG. 2 shows a construction of a random access memory (RAM) included into the electronic cash register of FIG. 1.

An electronic cash register (which is called an "ECR" below) of the present invention comprises a keyboard panel 1, a key input determination circuit 2, a read only memory (ROM) 3, a central processing unit (CPU) 4, a random access memory (RAM) 5, a display device 6, a printer system 7, a mode selection switch 8, a temporary memory 9, and a key actuation detection circuit 10.

The keyboard panel 1 has numeral keys 100 (N) for introducing numerical information, function keys 101 (F) for introducing operation commands, and department keys 103 (D) for indicating the department to which the purchased commodity belongs.

The key input determination circuit 2 is connected to the keyboard panel 1 in order to determine the key actuation by the operator. The key signal developed from the key input determination circuit 2 is introduced into the CPU 4 which operates in accordance with the operation programs as stored in the ROM 3.

The data processed in the CPU 4 is applied to and stored in the RAM 5. The data processed in the CPU 4 is further applied to the printer system 7 for printing out the transaction data onto a receipt slip and/or a journal paper, and to the display device 6 for displaying the transaction data. The mode selection switch 8 selects a desired operation mode of the electronic cash register. The mode of operation selected by the mode selection switch 8 is temporarily stored in the temporary memory 9. When any one of the keys included in the keyboard panel 1 is actuated, the key actuation detection circuit 10 operates so as to supply the mode information temporarily stored into the temporary memory 9 to a mode information memory area 104(a) included in the CPU 4.

The function keys 101 (F) include a plurality of total keys 102, for example, three total keys (A, B, and C), for actuating so as to register the input transaction data. The RAM 5 include a plurality of exemption flags 107(b), for example, three flags b(1), b(2), and b(3), in order to determine whether the registration with the exemption is carried out by actuating each of the total keys.

The exemption flags b(1), b(2), and b(3) correspond to the total keys A, B, and C, respectively.

If the flag 107 (b(1)) is set, the total key corresponding to the flag 107 is operated in order to register with the exemption. If the flag 107 is reset, the total key corresponding to the flag 107 is operated in order to normally register, for example, to register with the taxes.

The RAM 5 includes a tax rate memory area 108 (R) for storing tax rate information of the transaction, department memory areas, for example, a unit price memory area 105 (P) and a transaction sale amount memory area 106 (t), for storing department information of the respective commodities.

The respective data-preset operations for the ECR constructed above will be described with reference to the flow chart of FIG. 3.

When the desired data preset mode is selected by the mode selection switch 8 (step n1), the desired data preset mode code is temporarily stored in the temporary memory 9(step n2).

Under these conditions, when any one of the keys included in the keyboard panel 1 is actuated (step n3), the key actuation detection circuit 10 detects the key input via the key input determination circuit 2, so that the key actuation detection circuit 10 develops a control signal to supply the data preset mode code temporarily stored in the temporary memory 9 to the mode memory area 104 included in the CPU 4 (step n4).

The CPU 4 determines the preset mode information (step n5) and selects one of the routines of the data preset operation program stored in the ROM 3 based on the above determination. The respective data which is inputted thereafter is controlled by the routine of the data preset operation program selected by the CPU 4 (steps n5-n6, n5-n13, n5-n19).

The data preset operation program stored in the ROM 3 includes three preset routines, for example, a routine X for presetting the price unit as one of the department data of the respective commodities, a routine Y for presetting the tax rate of the transaction, a routine Z for presetting the exemption flag.

One of the preset routines in the data preset operation program stored in the ROM 3 is selected by the mode selection switch 8.

The exemption flag preset means of the present invention is operated to execute the present routine Z.

(I)ROUTINE X (THE PRICE UNIT PRESET MODE)

When the price unit preset mode is selected by the mode selection switch 8, the price unit preset operations (steps n6-n12) are carried out.

The unit price information of the respective departments is inputted to the CPU 4 through the key input determination circuit 2 by actuating the numeral keys 100 on the keyboard panel 1 (step n7). The operator actuates one of the department keys 103 in order to indicate the department related to the unit price inputted (step n8).

The CPU 4 having received the instruction related to the department through the key input determination circuit 2 selects and indicates one of the price unit memory areas 105 (P(i)) of the RAM 5 corresponding to the department indicated by the key actuation (step n9) and causes the unit price information to be stored into the unit price memory area 105 of the RAM 5 selected (step n10).

The unit price stored in the price unit memory area 105 is printed out by the printer system 7 onto the receipt slip and/or the journal paper (step n11), and/or displayed on the display device 6.

The above-mentioned operations (steps n9-n11) are repeated by the operator to preset the price unit information related to the whole department (step n12).

(II) ROUTINE Y (THE TAX RATE PRESET MODE)

When the tax rate preset mode is selected by the mode selection switch 8, the tax rate preset operations (steps n13-n18) are carried out.

The tax rate of the transaction (sale) amount is inputted into the CPU 4 by actuating the numeral keys 100 on the keyboard panel 1 through the key input determination circuit 2 (step n14). The operator actuates one of the function keys 101 in order to supply a control signal for judging the value therebefore inputted as the tax rate to the CPU 4 (step n15).

The CPU 4 having receives the control signal, selects and directs the tax rate memory area 108 of the RAM 5 (step n16) so as to store the tax rate data in the tax rate memory area 108 (step n17). The tax rate stored in the tax rate memory area 108 is printed out by the printer system 7 onto the receipt slip and/or the journal paper (step n18), and/or displayed on the display device 6.

(III) ROUTINE Z (THE EXEMPTION FLAG PRESET MODE)

The exemption flag preset means of the present invention is operated to execute routine Z.

When the exemption flag preset mode is selected by the mode selection switch 8, the exemption preset operation (steps n19-n25) is carried out.

Any one of the total keys 102 (A, B, and C) is actuated (step 20). The CPU 4 selectes and directs one of the exemption flags 107 (b(1)) of the RAM 5 corresponding to the actuated total key (step n21).

The flag 107 selected by actuating the total key 102 is set by actuating a flag preset instruction key on the keyboard panel 1 (step n22), and the number of the total key corresponding to the flag 107 (b(1)) set is printed out by the printer system 7 onto the receipt slip and/or the journal paper (step n14) indicating that the total key can be operated as an exemption key, and/or displayed on the display device 6.

The above-mentioned operations (steps n20-n24) are repeated by the operator so as to set or reset the exemption flag corresponding to the desired total key.

If the exemption flag corresponding to the total key actuated in the step n20 is set, the registration operation with the exemption is carried out by actuating the total key in step n20, so that the total key functions as a total key for registering with the exemption. If the exemption flag corresponding to the total key actuated in step n20 is reset, the registration with the taxes is carried out, so that the total key functions as a total key for registering wth the taxes.

FIG. 4 shows a flow chart for explaining a tax operation amd an exemption operation of the ECR of FIG. 1 when the registration mode is selected.

When the registration mode is selected by the mode selection switch 8 (step n30), the registration mode code is temporarily stored in the temporary memory 9. Under these conditions, when any one of the keys included in the keyboard panel 1 is actuated, the key actuation detection circuit 10 develops a control signal to supply the registration mode code temporarily stored in the temporary memory 9 with the mode memory area 104 (a) included in the CPU 4. The CPU 4 determines the mode information and selects the registration operation program stored in the ROM 3. The following operation is controlled by the registration program stored in the ROM 3.

The actual registration is conducted by, first, introducing the quantity information, the number of items purchased, through the numeral keys 100 (N) (step n31), and then, introducing the department information related to the article purchased through the use of the department keys 103 (D) (step n32).

The quantity information and the department information are applied to the CPU 4 via the key input determination circuit 2.

The CPU 4 reads out the unit price information of the article related to the actuated department key 103 (D) from the selected memory section (P(i)) in the unit drive memory area 105 (P) of the RAM 5 (step n33). Then, the CPU 4 conducts the calculation, (unit price)×(quantity), to obtain the transaction amount related to the article (step n34).

The calculation result in introduced into and stored in a preselected memory section (t(i)) in the transaction sale amount memory area 106 (t) of the RAM 5 (step n35), and is displayed on the display device 6, and further printed by the printer system 7 onto the receipt slip and/or the journal paper (step n36).

The above-mentioned operations are repeated to register the transaction information related to the whole amount of transaction articles before the operation of step n37 in which the operator actuates one of the total keys A, B, and C included in the function keys 101 (F).

The registration completion instruction is introduced into the CPU 4 by actuating the total key (step n38). The CPU 4 having received the above instruction functions to add up the transaction amount related to the transaction to obtain the transaction total amount (step n39), and functions to judge whether the exemption flag 107 (b(1)) corresponding to the actuated total key is set or reset (step n40) by searching the set/reset of the exemption flags 107 (b(1)) (steps n40–n41). The exemption flag determination means is operated to execute steps n40–n41.

In a case where the exemption flag corresponding to the total key actuated in step n37 is reset, the CPU reads out the tax rate stored in the tax rate memory area 108 (R) of the RAM 5 (step n42), and then, the CPU 4 conducts the calculation, (transaction total amount)×(tax rate), to obtain the tax amount related to the transaction (step n43).

The transaction total amount and the tax amount are stored in the the desired memory areas of the RAM 5, respectively (step n44). Simultaneously, these amounts are added to obtain a net total amount.

The transaction total amount, the tax amount, and the net total amount are displayed on the display device 6, and further are printed out onto the receipt slip and/or the journal paper (step n45).

After printing out the transaction total amount, the tax amount, and the net total amount onto the receipt slip and/or the journal paper, the operator receives money from the customer, and then the receipt and, if necessary, the change are given to the customer by the operator.

In a case where the exemption flag corresponding to the total key actuated by the operator is set, the operation proceeds to step n44 from step n41, and the transaction total amount is stored into the desired memory area of the RAM 5 (step n44).

The transaction total amount is displayed on the display device 6, and further is printed out onto the receipt slip and/or the journal paper (step n45).

After printing out the transaction total amounts onto the receipt slip and/or the journal paper, the operator receives the money from the customer and the receipt and, if necessary, the change are given to the customer by the operator.

If the tax operation is carried out in steps n42 and n43, the operator demands the payment, from the customer, the payment being equal to the transaction total amount and the tax amount. If the exemption operation is carried out in steps n41–n44 skipping steps n42 and n43, the operator demands the payment of the transaction total amount from the customer.

As described above, when the exemption flag corresponding to the total key actuated during registering is reset and the actuated total key is operated as a tax key, the tax rate is read out and the calculation of the tax amount is carried out for the tax operation. On the other hand, when the exemption flag corresponding to the actuated total key is set and the actuated total key is operated as an exemption key, the exemption operation is carried out by skipping steps n42 and n43 from the tax operation. Therefore, by selectively actuating the total key for the tax key or the exemption key, the taxation and exemption operations are automatically selected and registered, it is unnecessary to separately register for the taxation and the exemption operations.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
input means for introducing sale data including sale information and classification information, and function information into said electronic cash register;
mode selection means for selecting one of a plurality of operation modes, said plurality of operation modes including an exemption flag preset mode, and a registration mode;
a plurality of registration keys, each of said plurality of registration keys being operable in said exemption flag preset mode and said registration mode, a said registration key being actuated in said registration mode subsequent to the introduction of said sales data by said input means;
a plurality of exemption flags each corresponding to a one of said plurality of registration keys, each said flag having a set state representing an exemption state associated with said sales data and a reset state representing a tax state associated with said sales data;
means for setting and resetting said plurality of exemption flags in said exemption flag preset mode;

detection means for detecting the set or the reset state of any one of said plurality of exemption flags corresponding to said plurality of registration keys in said registration mode after input of said sale information; and selection means, responsive to said detection means, for selectively calculating a total sale price from said sale data and said set or reset state of said flags.

2. An electronic cash register according to claim 1, wherein said detection means is a key actuation detection circuit.

3. An electronic cash register according to claim 1, wherein said selection means is a central processing unit (CPU) which operates according to a plurality of programs stored in a read-only-memory (ROM).

4. An electronic cash register according to claim 3, wherein said plurality of programs correspond to said plurality of preset operation modes.

5. An electronic cash register according to claim 1, further including a random access memory for temporarily storing tax rate information of a transaction, department memory areas, and a transaction sale amount memory area.

6. An electronic cash register according to claim 1, wherein said plurality of operation modes further include a unit price preset mode and a tax rate preset mode.

* * * * *